(12) United States Patent
Huang et al.

(10) Patent No.: US 8,776,433 B2
(45) Date of Patent: Jul. 15, 2014

(54) PLANTING CONTAINER AND PLANTING TOWER

(75) Inventors: Tien-Fu Huang, Hsinchu County (TW); Chi-Hua Yu, Hsinchu (TW); Chen-Dao Shiao, Hsinchu (TW); Pei-Ying Chang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 209 days.

(21) Appl. No.: 13/400,131

(22) Filed: Feb. 20, 2012

(65) Prior Publication Data

US 2013/0152468 A1 Jun. 20, 2013

(30) Foreign Application Priority Data

Dec. 14, 2011 (TW) ............................... 100146266 A (51) Int. Cl.
*A01G 9/02* (2006.01)
*A01G 31/06* (2006.01)

(52) U.S. Cl.
CPC ................ *A01G 9/023* (2013.01); *A01G 9/022* (2013.01); *A01G 31/06* (2013.01)
USPC .................................................. 47/82; 47/83

(58) Field of Classification Search
USPC ....................... 47/82, 83, 65.5, 79, 86, 41.01; 220/23.4, 23.2, 23.6, 23.83, 23.86, 220/630; 206/504, 503, 509, 511
See application file for complete search history.

(56) References Cited

U.S. PATENT DOCUMENTS

| | | | | |
|---|---|---|---|---|
| 375,844 A * | 1/1888 | Toohey | ...................... | 211/85.17 |
| 3,302,843 A * | 2/1967 | Sheehan | ...................... | 229/108 |
| 4,055,022 A * | 10/1977 | Rowe | ................................. | 47/79 |
| D262,274 S * | 12/1981 | Lahr | ............................ | D11/152 |
| 4,550,837 A * | 11/1985 | Simmons | .................... | 211/128.1 |
| 4,779,378 A * | 10/1988 | Mason, Jr. | ......................... | 47/83 |
| 4,805,343 A * | 2/1989 | Patterson et al. | ................. | 47/79 |
| 5,111,939 A * | 5/1992 | Schafer | ......................... | 206/503 |
| 5,287,980 A * | 2/1994 | Saltz | ............................. | 220/4.27 |
| 5,367,823 A * | 11/1994 | Ferris | ............................. | 47/39 |
| 5,399,005 A * | 3/1995 | Schafer | ......................... | 312/107 |
| 5,502,922 A * | 4/1996 | Shlomo | ......................... | 47/62 R |
| 6,840,008 B1 | 1/2005 | Bullock et al. | | |
| 7,055,282 B2 | 6/2006 | Bryan, III | | |
| 2003/0089037 A1* | 5/2003 | Ware | ................................ | 47/83 |

(Continued)

FOREIGN PATENT DOCUMENTS

| CN | 201821727 | 5/2011 |
|---|---|---|
| EP | 1704770 | 9/2006 |

(Continued)

*Primary Examiner* — Son T Nguyen
*Assistant Examiner* — Kathleen Alker
(74) *Attorney, Agent, or Firm* — Jianq Chyun IP Office (57) ABSTRACT

A planting container is suitable for forming planting columns by using ones with the same structure three-dimensionally stacked. The planting columns are arranged around a center line parallel to the gravity direction to set up a planting tower. The planting container includes a bottom wall and a side wall. The side wall extends from the peripheral of the bottom wall and both walls define a containing space. The side wall has a planting opening communicating with the containing space. The side wall has a top end and a bottom end. When two containers with the same structure are three-dimensionally stacked by each other, the bottom end of the upper container engages with the top end of the lower container. The side wall laterally tilts towards the center line relatively to the bottom wall, so that the planting column tilts towards the adjacent column and tilts towards the center line.

12 Claims, 6 Drawing Sheets

(56) References Cited

U.S. PATENT DOCUMENTS

| | | | |
|---|---|---|---|
| 2008/0216403 A1 | 9/2008 | Schmidt et al. | |
| 2010/0287833 A1* | 11/2010 | Keats | 47/81 |
| 2011/0113685 A1* | 5/2011 | Chang | 47/39 |
| 2013/0152467 A1* | 6/2013 | Chang | 47/82 |

FOREIGN PATENT DOCUMENTS

| | | | | |
|---|---|---|---|---|
| JP | 05130810 A | * | 5/1993 | A01G 1/00 |
| JP | 2000316401 A | * | 11/2000 | A01G 31/00 |
| JP | 2011217693 A | * | 11/2011 | |
| KR | 100499610 | | 7/2005 | |
| TW | 402862 | | 8/2000 | |
| TW | 403628 | | 9/2000 | |
| TW | 412399 | | 11/2000 | |
| TW | 445759 | | 7/2001 | |
| TW | 453851 | | 9/2001 | |
| TW | M251451 | | 12/2004 | |
| TW | M368300 | | 11/2009 | |

* cited by examiner

PLANTING CONTAINER AND PLANTING TOWER

CROSS-REFERENCE TO RELATED APPLICATION

This application claims the priority benefit of Taiwan application serial no. 100146266, filed on Dec. 14, 2011. The entirety of the above-mentioned patent application is hereby incorporated by reference herein and made a part of this specification.

BACKGROUND

1. Technical Field

The disclosure generally relates to a planting container and a planting tower. applied in three-dimensional planting.

2. Related Art

Modern agricultural techniques steadily increase the level thereof to advance the quality and quantity of agricultural products. In order to improve the productivity of the agricultural products, in a limited planting area, in addition to improve the planting varieties, another way is to change the way of planting. In the planting regions with short sunshine and with smaller areas available for planting, a useful two-dimensional planting mode can be changed into a three-dimensional planting mode, which helps to improve the utilization of sunlight and increase the utilization of planting area. Therefore, for the planting regions with short sunshine and with smaller areas available for planting, there is a high demand for three-dimensional planting tools.

SUMMARY

Accordingly, the disclosure is directed to a planting container applied in three-dimensional planting.

The disclosure is also directed to a planting tower applied in three-dimensional planting.

The disclosure provides a planting container suitable to be three-dimensionally stacked to form a plurality of planting columns by using a plurality of ones with the same structure. The planting columns are arranged around a center line parallel to the gravity direction so as to set up a planting tower. The planting container includes a bottom wall and a side wall. The side wall extends from the peripheral of the bottom wall and with the bottom wall together defines a containing space, in which the side wall has a planting opening communicating with the containing space. The side wall has a top end and a bottom end, the bottom end is closer to the bottom wall than the top end, and when two of the planting containers with the same structure are three-dimensionally stacked by each other, the bottom end of the upper planting container engages with the top end of the lower planting container. The side wall laterally tilts towards the center line relatively to the bottom wall, so that the planting column tilts towards the adjacent planting column and tilts towards the center line.

The disclosure also provides a planting tower including a plurality of planting columns arranged around a center line parallel to the gravity direction. Each of the planting columns includes a plurality of planting containers three-dimensionally stacked by each other with the same structure. Each of the planting containers includes a bottom wall and a side wall. The side wall extends from the peripheral of the bottom wall and with the bottom wall together defines a containing space, in which the side wall has a planting opening communicating with the containing space. The side wall has a top end and a bottom end, the bottom end is closer to the bottom wall than the top end. When two of the planting containers with the same structure are three-dimensionally stacked by each other, the bottom end of the upper planting container engages with the top end of the lower planting container. The side wall laterally tilts towards the center line relatively to the bottom wall, so that the planting column tilts towards the adjacent planting column and tilts towards the center line.

Based on the description above, the disclosure makes a plurality of planting containers with the same structure three-dimensionally stacked by each other to form a plurality of planting columns and the planting columns are arranged around a center line parallel to the gravity direction to set up a planting tower. By means of the tilting design of the planting containers, each of the planting columns tilts towards the adjacent planting column and the planting columns tilt towards the center line, which help to enhance the structure stability of the planting tower and advance the utilization of sunlight.

Several exemplary embodiments accompanied with figures are described in detail below to further describe the disclosure.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
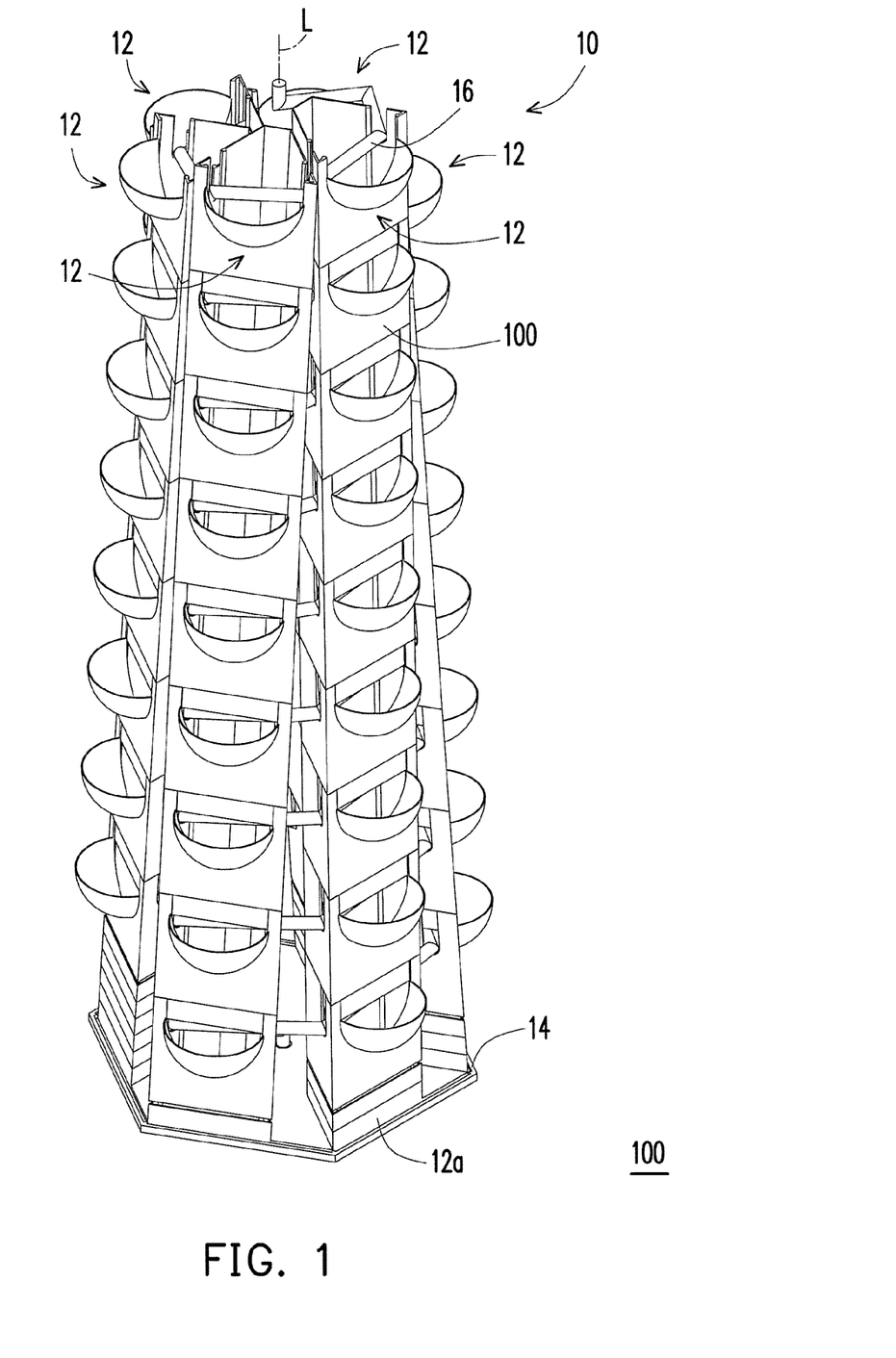
FIG. 1 is a perspective view of a planting tower according to an exemplary embodiment.
Figure 2:
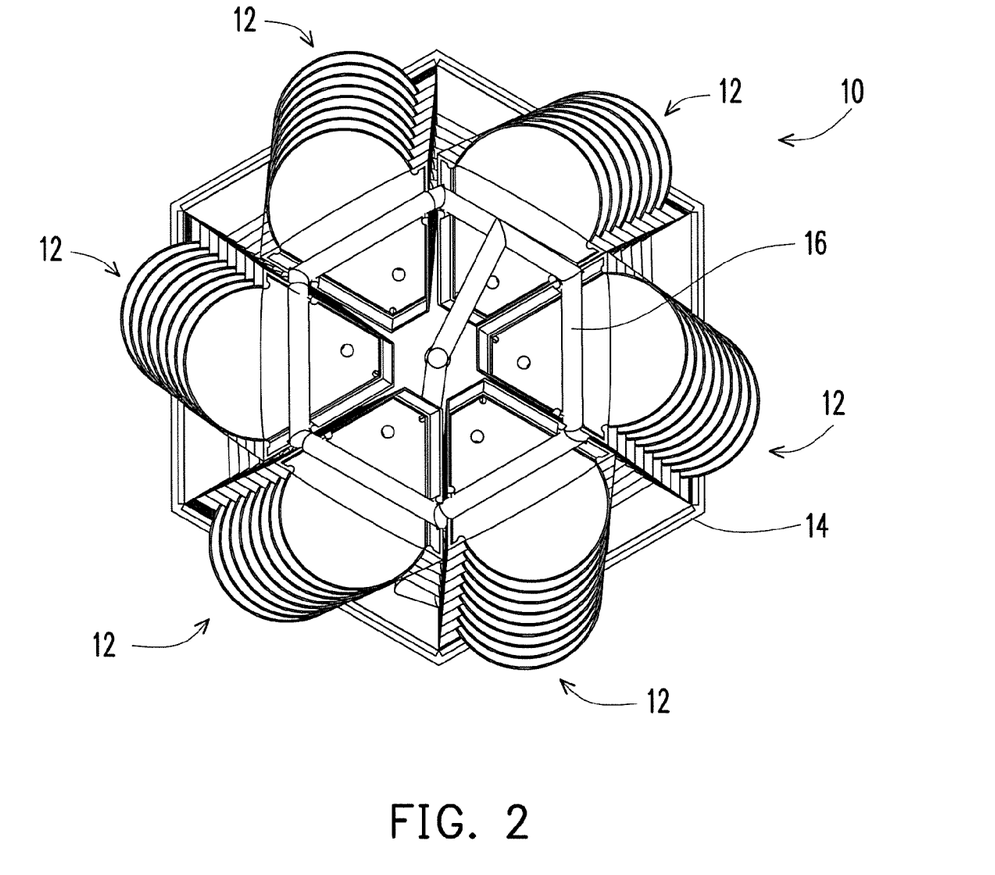
FIG. 2 is an enlarged top view of the planting tower of FIG. 1.

FIG. 1 is a perspective view of a planting tower according to an exemplary embodiment, and FIG. 2 is an enlarged top view of the planting tower of FIG. 1. Referring to FIGS. 1 and 2, a planting tower 10 of the embodiment includes a plurality of planting columns 12, which are arranged around a center line L parallel to the gravity direction and each of the planting columns 12 includes a plurality of planting containers 100 with the same structure and three-dimensionally stacked by each other. In the embodiment, the planting containers 100 may be mass produced in injection molding process to lower down the production cost.

In the embodiment, the planting tower 10 may further include a base 14 for setting up the planting columns 12. By means of the tilting design of the planting containers 100, each of the planting columns 12 tilts not only towards the adjacent planting column 12, but also towards the center line L. The planting columns 12 in such arrangement look like a polygon pyramid.

Figure 3:
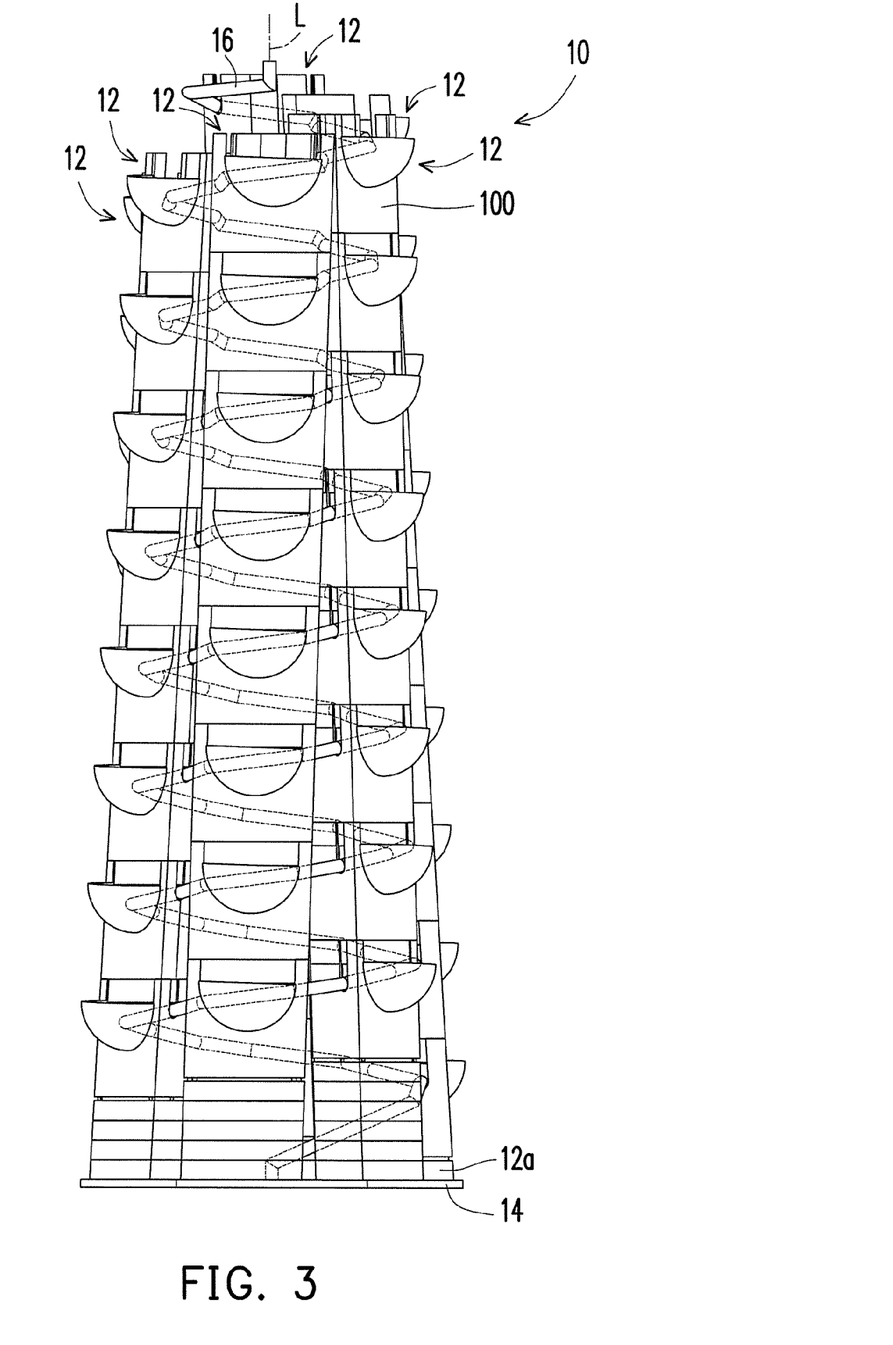
FIG. 3 is a front view of the planting tower of FIG. 1.

FIG. 3 is a front view of the planting tower of FIG. 1. Referring to FIGS. 1 and 3, the planting tower 10 may further include a guiding pipe 16, and the guiding pipe 16 extends and passes through the planting containers 100 for applying planting liquid material, for example, liquid water. In order to use the gravity to apply planting liquid material to the planting containers 100 via the guiding pipe 16, it is designed that the guiding pipe 16 helically extends from the tops of the planting columns 12 down to the bottoms of the planting columns 12. In this way, the guiding pipe 16 extends and passes through all the planting containers 100 to apply the planting liquid material thereto.

In the embodiment, the planting column 12 may further include one or multiple bottom frames 12a. The bottom frames 12a are connected to the bottoms of the corresponding planting containers 100 to increase the heights of the corresponding planting containers 100, so that it is ensured the guiding pipe 16 can helically extends from the tops of the planting columns 12 down to the bottoms of the planting columns 12.

Figure 4:
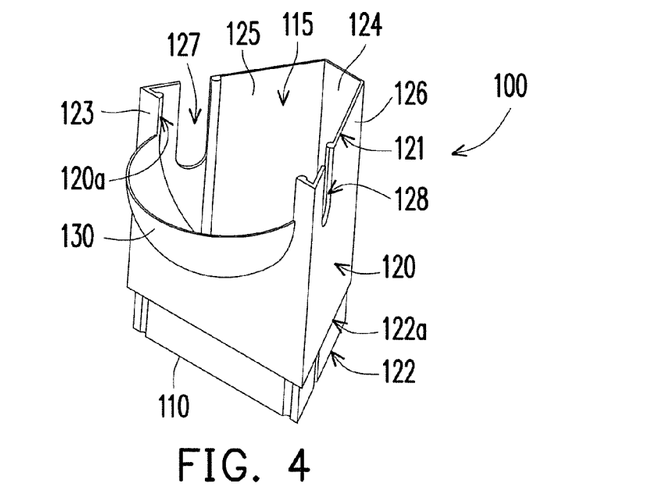
FIG. 4 is an enlarged perspective view of the planting container of FIG. 1.
Figure 5:
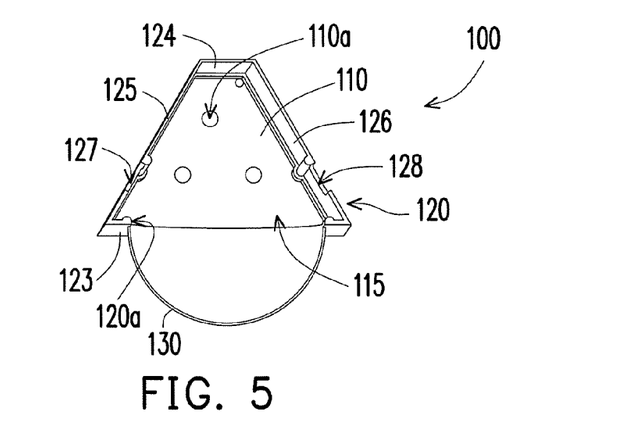
FIG. 5 is a top view of the planting container of FIG. 4.
Figure 6:
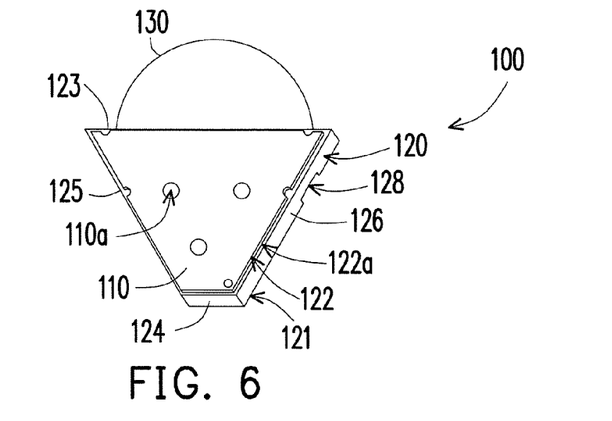
FIG. 6 is a bottom view of the planting container of FIG. 4.

FIG. 4 is an enlarged perspective view of the planting container of FIG. 1, FIG. 5 is a top view of the planting container of FIG. 4, and FIG. 6 is a bottom view of the planting container of FIG. 4. Referring to FIGS. 4-6, the planting container 100 includes a bottom wall 110 and a side wall 120. The side wall 120 extends from the peripheral of the bottom wall 110 and with the bottom wall 110 together defines a containing space 115 to accommodate planting medium. The side wall 120 further has a planting opening 120a communicating with the containing space 115 for growing plants. In the embodiment, the bottom wall 110 further has one or multiple drain holes 110a for draining surplus planting liquid material. The planting container 100 further includes a holding cup 130 which connects the side wall 120 and communicates with the planting opening 120a.

Figure 7:
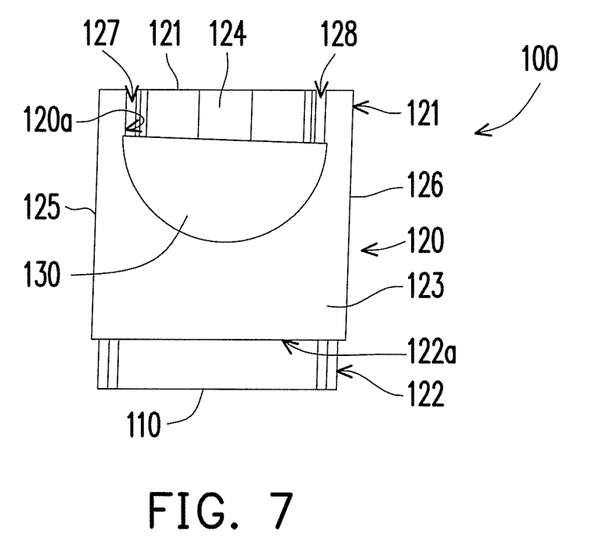
FIG. 7 is a front view of the planting container of FIG. 4.
Figure 8:
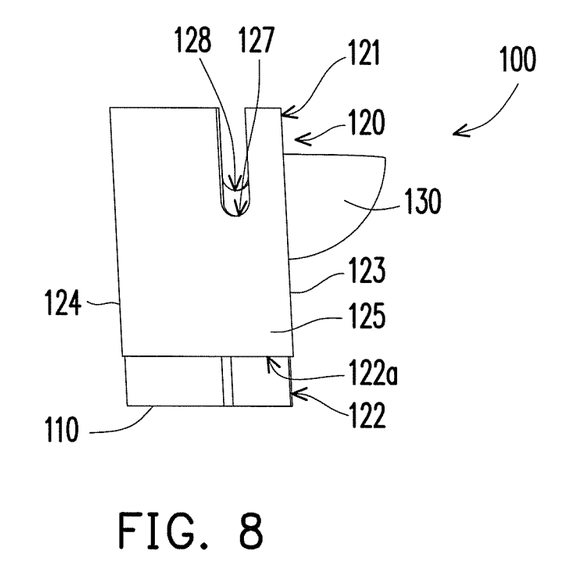
FIG. 8 is a left side view of the planting container of FIG. 4.

FIG. 7 is a front view of the planting container of FIG. 4, and FIG. 8 is a left side view of the planting container of FIG. 4. Referring to FIGS. 4, 7 and 8, the side wall 120 has a top end 121 and a bottom end 122. The bottom end 122 is closer to the bottom wall 110 than the top end 121. When two of the planting containers 100 with the same structure are three-dimensionally stacked by each other, the bottom end 122 of the upper planting container 100 engages with the top end 121 of the lower planting container 100.

In the embodiment, the bottom end 122 may have a step structure 122a. When two of the planting containers 100 with the same structure are three-dimensionally stacked by each other, the upper planting container 100 engages with the lower planting container 100 through the step structure 122a. In addition, the planting opening 120a may extends to the top end 121. When two of the planting containers 100 with the same structure are three-dimensionally stacked by each other, the side wall 120 of the upper planting container 100 is overlapped with the planting opening 120a of the lower planting container 100 for defining a region of the planting opening 120a to communicate with the containing space 115.

Referring to FIGS. 7 and 8 again, the side wall 120 has a front portion 123, a first side portion 125, a second side portion 126 and a rear portion 124. The front portion 123 is opposite to the rear portion 124, the first side portion 125 connects a side of the front portion 123 and a side of the rear portion 124, and the second side portion 126 connects another side of the front portion 123 and another side of the rear portion 124.

Figure 9:
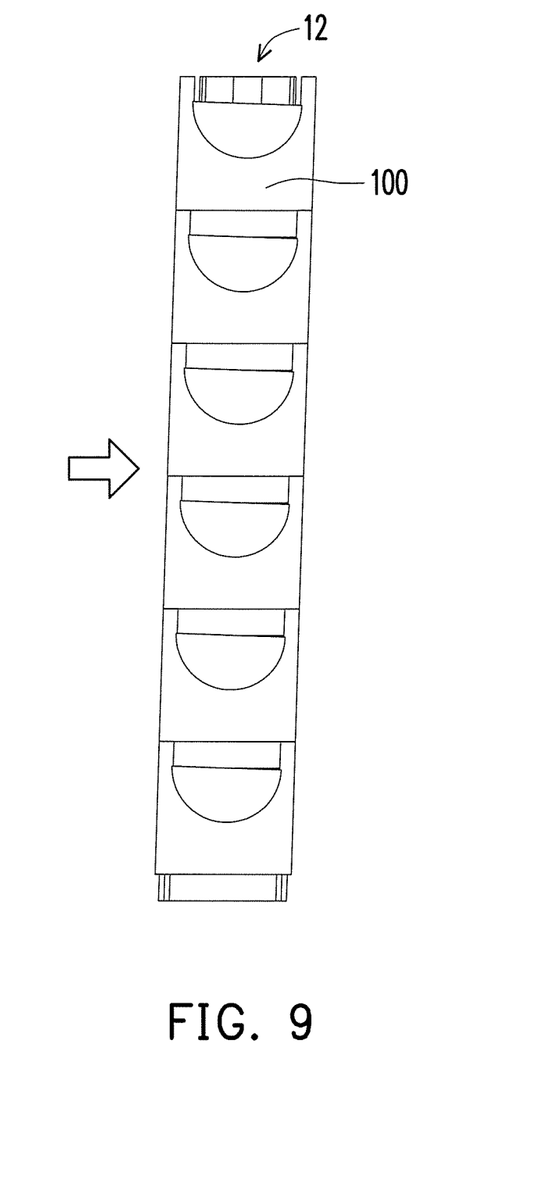
FIG. 9 is a front view of the planting column of FIG. 1.

FIG. 9 is a front view of the planting column of FIG. 1. Referring to FIGS. 7 and 9, in order to make the planting column 12 tilt towards the adjacent planting column 12, the side wall 120 laterally tilts relatively to the bottom wall 110. In the embodiment, both the first side portion 125 and the second side portion 126 tilt relatively to the bottom wall 110 along the direction from the first side portion 125 to the second side portion 126 so that the side wall 120 laterally tilts relatively to the bottom wall 110.

Figure 10:
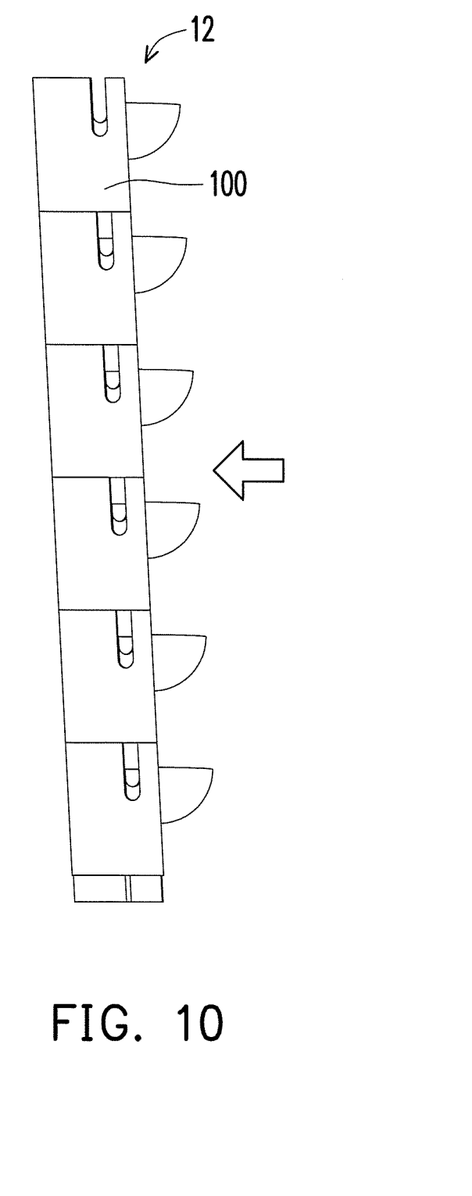
FIG. 10 is a left side view of the planting column of FIG. 9.

FIG. 10 is a left side view of the planting column of FIG. 9. Referring to FIGS. 8 and 10, to make the planting columns 12 tilt towards the center line L (shown in FIGS. 1 and 3), the side walls 120 tilt towards the center line L. In the embodiment, both the front portion 123 and the rear portion 124 tilt relatively to the bottom wall 110 along the direction from the front portion 123 to the rear portion 124, and thus, the side wall 120 tilts towards the center line L.

Referring to FIGS. 2 and 4, in the embodiment, to allow the guiding pipe 16 extending and passing through the planting containers 100 to apply planting liquid material, the side wall 120 may have a first guiding pipe notch 127 and a second guiding pipe notch 128, which allow the guiding pipe 16 extending and passing through. The first guiding pipe notch 127 is located at the first side portion 125 and extends to the top end 121, and the second guiding pipe notch 128 is located at the second side portion 126 and extends to the top end 121. The lower end of the first guiding pipe notch 127 is closer to the bottom wall 110 than the lower end of the second guiding pipe notch 128. In this way, when two of the planting containers 100 with the same structure are three-dimensionally stacked by each other, the side wall 120 of the upper planting container 100 is overlapped with the first guiding pipe notch 127 and the second guiding pipe notch 128 of the lower planting container 100 for defining the region used to allow the guiding pipe 16 extending and passing through by the first guiding pipe notch 127 and the second guiding pipe notch 128.

In the embodiment, the depth of the first guiding pipe notch 127 relative to the top end 121 is greater than the depth of the second guiding pipe notch 128 relative to the top end 121, so that a section of the guiding pipe 16 passing through the same planting container 100 can tilt towards the gravity direction, which helps the smooth flowing of the planting liquid material in the guiding pipe 16.

In summary, the disclosure makes a plurality of planting containers with the same structure three-dimensionally stacked by each other to form a plurality of planting columns and the planting columns are arranged around a center line parallel to the gravity direction to set up a planting tower. By means of the tilting design of the planting containers, each of the planting columns tilts towards the adjacent planting column and the planting columns tilt towards the center line, which help to enhance the structure stability of the planting tower and advance the utilization of sunlight.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. A planting tower, comprising:
a plurality of planting columns arranged around a center line parallel to the gravity direction and leaning against each other, each of the planting columns comprising a plurality of planting containers three-dimensionally stacked on each other with the same structure,
wherein each of the planting containers comprises:
a bottom wall; and
a side wall extending from the peripheral edge of the bottom wall and defining a containing space with the bottom wall, the side wall having a planting opening communicating with the containing space, wherein the side wall has a top end and a bottom end, the bottom end is closer to the bottom wall than the top end, and when two of the planting containers with the same structure are three-dimensionally stacked on each other, the bottom end of the upper planting container engages with the top end of the lower planting container, wherein the side wall laterally tilts towards the center line relative to the bottom wall, so that each of the planting columns tilts towards an adjacent planting column and tilts towards the center line.

2. The planting tower as claimed in claim 1, wherein the bottom wall has a plurality of drain holes.

3. The planting tower as claimed in claim 1, wherein the bottom end has a step structure, and when two of the planting containers with the same structure are three-dimensionally stacked on each other, the upper planting container engages with the lower planting container through the step structure.

4. The planting tower as claimed in claim 1, wherein the planting opening extends to the top end, and when two of the planting containers with the same structure are three-dimensionally stacked on each other, the side wall of the upper planting container is overlapped with the planting opening of the lower planting container for defining the region of the planting opening communicating with the containing space.

5. The planting tower as claimed in claim 1, wherein the planting container further comprises:

a holding cup connected to the side wall and communicating with the planting opening.

6. The planting tower as claimed in claim 1, wherein the side wall has a front portion, a first side portion, a second side portion and a rear portion, the front portion is opposite to the rear portion, the first side portion connects a side of the front portion and a side of the rear portion, the second side portion connects another side of the front portion and another side of the rear portion, both the first side portion and the second side portion tilt relatively to the bottom wall along the direction from the first side portion to the second side portion so that each of the planting columns tilts towards an adjacent planting column, and both the front portion and the rear portion tilt relatively to the bottom wall along the direction from the front portion to the rear portion so that the planting columns tilt towards the center line.

7. The planting tower as claimed in claim 1, further comprising:

a guiding pipe extending and passing through the planting containers for applying planting liquid material, wherein the side wall has a first guiding pipe notch and a second guiding pipe notch for allowing the guiding pipe to extend and pass through, the first guiding pipe notch is located at the first side portion and extends to the top end, the second guiding pipe notch is located at the second side portion and extends to the top end, a lower end of the first guiding pipe notch is closer to the bottom wall than a lower end of the second guiding pipe notch, and when two of the planting containers with the same structure are three-dimensionally stacked on each other, the side wall of the planting container is overlapped with the first guiding pipe notch and the second guiding pipe notch of the planting container for defining the region used to allow the guiding pipe extending and passing through on the first guiding pipe notch and the second guiding pipe notch.

8. The planting tower as claimed in claim 7, wherein the depth of the first guiding pipe notch relative to the top end is greater than the depth of the second guiding pipe notch relative to the top end so that a section of the guiding pipe passing through the same planting container tilts towards the gravity direction.

9. The planting tower as claimed in claim 1, further comprising:

a base for setting up the planting columns.

10. The planting tower as claimed in claim 1, further comprising:

a guiding pipe extending and passing through the planting containers for applying planting liquid material.

11. The planting tower as claimed in claim 10, wherein the guiding pipe helically extends and passes through the planting containers.

12. The planting tower as claimed in claim 1, wherein the planting column further comprises:

a bottom frame connected to a bottom of the corresponding planting container for increasing the height of the corresponding planting column.

\* \* \* \* \*